(12) United States Patent
Chun et al.

(10) Patent No.: US 8,798,070 B2
(45) Date of Patent: *Aug. 5, 2014

(54) METHOD OF TRANSMITTING DATA IN A WIRELESS COMMUNICATION SYSTEM

(75) Inventors: Sung Duck Chun, Anyang-si (KR); Young Dae Lee, Anyang-si (KR); Sung June Park, Anyang-si (KR); Seung June Yi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 313 days.

This patent is subject to a terminal disclaimer.

(21) Appl. No.: 13/116,881

(22) Filed: May 26, 2011

(65) Prior Publication Data

US 2011/0228799 A1    Sep. 22, 2011

Related U.S. Application Data

(63) Continuation of application No. 12/451,219, filed as application No. PCT/KR2008/002484 on May 1, 2008, now Pat. No. 7,965,740.

(60) Provisional application No. 60/915,917, filed on May 3, 2007, provisional application No. 60/915,666, filed on May 2, 2007.

(30) Foreign Application Priority Data

Apr. 30, 2008    (KR) .................... 10-2008-0040614

(51) Int. Cl.
*H04L 5/14*    (2006.01)

(52) U.S. Cl.
USPC ............................. 370/394; 370/474; 709/247

(58) Field of Classification Search
USPC ......... 370/395, 387, 352, 474–479, 521–536; 709/247
See application file for complete search history.

(56) References Cited

U.S. PATENT DOCUMENTS

| 4,205,200 A | 5/1980 | Dharia et al. |
|---|---|---|
| 5,588,009 A | 12/1996 | Will |

(Continued)

FOREIGN PATENT DOCUMENTS

| CN | 1549612 | 11/2004 |
|---|---|---|
| CN | 1719932 | 1/2006 |

(Continued)

OTHER PUBLICATIONS

LG Electronics, "DRX Scheme", 3GPP TSG-RAN WG2 #56bis, Jan. 15-19, 2007, Sorrento, Italy, R2-070265.

(Continued)

*Primary Examiner* — Ricky Ngo
*Assistant Examiner* — Iqbal Zaidi
(74) *Attorney, Agent, or Firm* — McKenna Long & Aldridge LLP

(57) ABSTRACT

A method of generating a data block to be transmitted from a protocol layer to a receiving side in a wireless communication system, the protocol layer having a header compression function, comprises generating at least one of a control packet which includes control information and a compressed packet generated by header compression for an upper layer data block, and generating a first lower layer data block which includes type indication information and the control packet, if the control packet is generated, the type indication information indicating a type of control information included in the generated control packet.

17 Claims, 9 Drawing Sheets

(56) References Cited

U.S. PATENT DOCUMENTS

| | | |
|---|---|---|
| 5,894,595 A | 4/1999 | Foladare et al. |
| 6,157,833 A | 12/2000 | Lawson-Jenkins et al. |
| 6,233,430 B1 | 5/2001 | Helferich |
| 6,324,171 B1 | 11/2001 | Lee et al. |
| 6,353,628 B1 | 3/2002 | Wallace et al. |
| 6,526,027 B1 | 2/2003 | Yeom et al. |
| 6,567,409 B1 | 5/2003 | Tozaki et al. |
| 6,725,267 B1 | 4/2004 | Hoang |
| 6,785,256 B2 | 8/2004 | O'Neill |
| 6,795,419 B2 | 9/2004 | Parantainen et al. |
| 7,039,425 B1 | 5/2006 | Mazawa et al. |
| 7,197,317 B2 | 3/2007 | Parkvall et al. |
| 7,245,707 B1 | 7/2007 | Chan |
| 7,373,148 B2 | 5/2008 | Kim et al. |
| 7,443,813 B2 | 10/2008 | Hwang et al. |
| 7,457,588 B2 | 11/2008 | Love et al. |
| 7,525,908 B2 | 4/2009 | Olsson et al. |
| 7,551,643 B2 | 6/2009 | Yeo et al. |
| 7,606,370 B2 | 10/2009 | Lillie et al. |
| 7,680,058 B2 | 3/2010 | Seurre et al. |
| 7,769,351 B2 | 8/2010 | Kwak et al. |
| 7,801,527 B2 | 9/2010 | Putcha |
| 7,864,731 B2 | 1/2011 | Forsberg |
| 7,899,451 B2 | 3/2011 | Hu et al. |
| 7,912,471 B2 | 3/2011 | Kodikara Patabandi et al. |
| 7,916,697 B2 | 3/2011 | Eklund |
| 7,958,542 B2 | 6/2011 | Herrmann |
| 8,064,676 B2 | 11/2011 | Li et al. |
| 8,427,997 B2 | 4/2013 | Ren et al. |
| 8,582,482 B2 | 11/2013 | Hsu |
| 8,582,487 B2 | 11/2013 | Gou et al. |
| 8,588,100 B2 | 11/2013 | Wei |
| 8,614,971 B2 | 12/2013 | Kim et al. |
| 2001/0017850 A1 | 8/2001 | Kalliokulju et al. |
| 2001/0034791 A1 | 10/2001 | Clubb et al. |
| 2001/0044322 A1 | 11/2001 | Raaf |
| 2002/0024972 A1 | 2/2002 | Yi et al. |
| 2002/0028690 A1 | 3/2002 | McKenna et al. |
| 2002/0057663 A1 | 5/2002 | Lim |
| 2002/0059464 A1 | 5/2002 | Hata et al. |
| 2002/0091860 A1 | 7/2002 | Kalliokulju et al. |
| 2002/0114294 A1 | 8/2002 | Toskala et al. |
| 2003/0007490 A1 | 1/2003 | Yi et al. |
| 2003/0007512 A1 | 1/2003 | Tourunen et al. |
| 2003/0050078 A1 | 3/2003 | Motegi et al. |
| 2003/0119488 A1 | 6/2003 | Hans et al. |
| 2003/0123485 A1* | 7/2003 | Yi et al. ............ 370/477 |
| 2003/0125056 A1 | 7/2003 | Jiang |
| 2003/0139170 A1 | 7/2003 | Heo |
| 2003/0147371 A1 | 8/2003 | Choi et al. |
| 2003/0165122 A1 | 9/2003 | Westphal |
| 2003/0165133 A1 | 9/2003 | Garani |
| 2003/0165166 A1 | 9/2003 | Funakawa |
| 2003/0189922 A1* | 10/2003 | Howe ............ 370/352 |
| 2003/0207696 A1 | 11/2003 | Willenegger et al. |
| 2003/0223452 A1 | 12/2003 | Toskala et al. |
| 2003/0227875 A1 | 12/2003 | Wei et al. |
| 2004/0014452 A1 | 1/2004 | Lim et al. |
| 2004/0028078 A1 | 2/2004 | Beckmann et al. |
| 2004/0039830 A1 | 2/2004 | Zhang et al. |
| 2004/0042507 A1 | 3/2004 | Pelletier et al. |
| 2004/0087320 A1 | 5/2004 | Kim et al. |
| 2004/0100940 A1 | 5/2004 | Kuure et al. |
| 2004/0117860 A1 | 6/2004 | Yi et al. |
| 2004/0121771 A1 | 6/2004 | Song et al. |
| 2004/0147269 A1 | 7/2004 | Kim |
| 2004/0148427 A1 | 7/2004 | Nakhjiri et al. |
| 2004/0176112 A1 | 9/2004 | Beckmann et al. |
| 2004/0180675 A1 | 9/2004 | Choi et al. |
| 2004/0185837 A1 | 9/2004 | Kim et al. |
| 2004/0202107 A1 | 10/2004 | Bensimon et al. |
| 2004/0229605 A1 | 11/2004 | Hwang et al. |
| 2004/0233870 A1 | 11/2004 | Willenegger |
| 2004/0242195 A1 | 12/2004 | Chun et al. |
| 2004/0253959 A1 | 12/2004 | Hwang et al. |
| 2005/0009527 A1 | 1/2005 | Sharma |
| 2005/0018624 A1 | 1/2005 | Meier et al. |
| 2005/0032555 A1 | 2/2005 | Jami et al. |
| 2005/0037767 A1 | 2/2005 | Kim et al. |
| 2005/0041610 A1 | 2/2005 | Lee et al. |
| 2005/0041681 A1 | 2/2005 | Lee et al. |
| 2005/0053029 A1 | 3/2005 | Lee et al. |
| 2005/0063347 A1 | 3/2005 | Sarkkinen et al. |
| 2005/0070253 A1 | 3/2005 | Farnsworth et al. |
| 2005/0085254 A1 | 4/2005 | Chuah et al. |
| 2005/0094670 A1 | 5/2005 | Kim |
| 2005/0100048 A1 | 5/2005 | Chun et al. |
| 2005/0141462 A1 | 6/2005 | Aerraboutu et al. |
| 2005/0141471 A1 | 6/2005 | Virtanen et al. |
| 2005/0141538 A1 | 6/2005 | Beckmann et al. |
| 2005/0141541 A1 | 6/2005 | Cuny et al. |
| 2005/0160184 A1 | 7/2005 | Walsh et al. |
| 2005/0164719 A1 | 7/2005 | Waters |
| 2005/0176430 A1 | 8/2005 | Lee et al. |
| 2005/0176474 A1 | 8/2005 | Lee et al. |
| 2005/0185620 A1 | 8/2005 | Lee et al. |
| 2005/0232271 A1 | 10/2005 | Kettunen et al. |
| 2005/0238051 A1 | 10/2005 | Yi et al. |
| 2005/0249188 A1 | 11/2005 | Hayashi |
| 2005/0265294 A1 | 12/2005 | Hu et al. |
| 2005/0286470 A1 | 12/2005 | Asthana et al. |
| 2005/0288022 A1 | 12/2005 | Ryu et al. |
| 2006/0013165 A1 | 1/2006 | Choi et al. |
| 2006/0034335 A1 | 2/2006 | Karaoguz et al. |
| 2006/0039309 A1 | 2/2006 | Lee et al. |
| 2006/0067324 A1 | 3/2006 | Kim et al. |
| 2006/0067364 A1 | 3/2006 | Jung et al. |
| 2006/0087994 A1 | 4/2006 | Barth et al. |
| 2006/0098567 A1 | 5/2006 | Willenegger et al. |
| 2006/0098688 A1 | 5/2006 | Parkvall et al. |
| 2006/0126554 A1 | 6/2006 | Motegi et al. |
| 2006/0126570 A1 | 6/2006 | Kim et al. |
| 2006/0142019 A1 | 6/2006 | Kroth et al. |
| 2006/0165045 A1 | 7/2006 | Kim et al. |
| 2006/0187846 A1 | 8/2006 | Pelletier et al. |
| 2006/0203760 A1 | 9/2006 | Fukui et al. |
| 2006/0209870 A1 | 9/2006 | Lee et al. |
| 2006/0218271 A1 | 9/2006 | Kasslin et al. |
| 2006/0245417 A1 | 11/2006 | Conner et al. |
| 2006/0251105 A1 | 11/2006 | Kim et al. |
| 2006/0262811 A1 | 11/2006 | Jiang |
| 2007/0041349 A1 | 2/2007 | Kim et al. |
| 2007/0041382 A1 | 2/2007 | Vayanos et al. |
| 2007/0047452 A1 | 3/2007 | Lohr |
| 2007/0047493 A1 | 3/2007 | Park et al. |
| 2007/0047582 A1 | 3/2007 | Malkamaki |
| 2007/0060139 A1 | 3/2007 | Kim et al. |
| 2007/0064631 A1 | 3/2007 | Tseng et al. |
| 2007/0064665 A1 | 3/2007 | Zhang et al. |
| 2007/0155389 A1 | 7/2007 | Zhang |
| 2007/0155390 A1 | 7/2007 | Patabandi et al. |
| 2007/0165567 A1 | 7/2007 | Tan et al. |
| 2007/0165635 A1 | 7/2007 | Zhang et al. |
| 2007/0177569 A1 | 8/2007 | Lundby |
| 2007/0206531 A1 | 9/2007 | Pajukoski et al. |
| 2007/0224993 A1 | 9/2007 | Forsberg |
| 2007/0248075 A1 | 10/2007 | Liu et al. |
| 2007/0254679 A1 | 11/2007 | Montojo et al. |
| 2007/0258591 A1 | 11/2007 | Terry et al. |
| 2007/0291634 A1 | 12/2007 | Kwon et al. |
| 2007/0291646 A1 | 12/2007 | Ohishi et al. |
| 2007/0291673 A1 | 12/2007 | Demirhen et al. |
| 2007/0291695 A1 | 12/2007 | Sammour et al. |
| 2007/0291719 A1 | 12/2007 | Demirhan et al. |
| 2007/0291728 A1 | 12/2007 | Dalsgaard et al. |
| 2007/0291729 A1 | 12/2007 | Dalsgaard et al. |
| 2007/0291788 A1 | 12/2007 | Sammour et al. |
| 2007/0293224 A1 | 12/2007 | Wang et al. |
| 2008/0004058 A1 | 1/2008 | Jeong et al. |
| 2008/0009289 A1 | 1/2008 | Kashima et al. |
| 2008/0043619 A1 | 2/2008 | Sammour et al. |
| 2008/0056198 A1 | 3/2008 | Charpentier et al. |
| 2008/0056273 A1 | 3/2008 | Pelletier et al. |
| 2008/0064390 A1 | 3/2008 | Kim |

(56) References Cited

U.S. PATENT DOCUMENTS

| | | |
|---|---|---|
| 2008/0076359 A1 | 3/2008 | Charpentier et al. |
| 2008/0089285 A1 | 4/2008 | Pirskanen et al. |
| 2008/0089292 A1 | 4/2008 | Kitazoe et al. |
| 2008/0095185 A1 | 4/2008 | DiGirolamo et al. |
| 2008/0101268 A1 | 5/2008 | Sammour et al. |
| 2008/0167089 A1 | 7/2008 | Suzuki et al. |
| 2008/0181127 A1 | 7/2008 | Terry et al. |
| 2008/0182594 A1 | 7/2008 | Flore et al. |
| 2008/0186946 A1 | 8/2008 | Marinier et al. |
| 2008/0188223 A1 | 8/2008 | Vesterinen et al. |
| 2008/0225744 A1 | 9/2008 | DiGirolamo et al. |
| 2008/0225765 A1 | 9/2008 | Marinier et al. |
| 2008/0240439 A1 | 10/2008 | Mukherjee et al. |
| 2008/0267126 A1 | 10/2008 | Vujcic |
| 2008/0267405 A1 | 10/2008 | Vialen et al. |
| 2008/0268850 A1 | 10/2008 | Narasimha et al. |
| 2008/0273610 A1 | 11/2008 | Malladi et al. |
| 2008/0280567 A1 | 11/2008 | Sharma |
| 2008/0285691 A1 | 11/2008 | Onggosanusi et al. |
| 2008/0287091 A1 | 11/2008 | Suzuki et al. |
| 2008/0287129 A1 | 11/2008 | Somasundaram et al. |
| 2008/0310452 A1 | 12/2008 | Vedantham et al. |
| 2008/0316959 A1 | 12/2008 | Bachl et al. |
| 2009/0005051 A1 | 1/2009 | Voyer et al. |
| 2009/0022107 A1 | 1/2009 | Kapoor et al. |
| 2009/0034466 A1 | 2/2009 | Lindskog et al. |
| 2009/0040982 A1 | 2/2009 | Ho et al. |
| 2009/0086659 A1 | 4/2009 | Pani et al. |
| 2009/0086710 A1 | 4/2009 | Ho |
| 2009/0092076 A1 | 4/2009 | Zheng et al. |
| 2009/0109912 A1 | 4/2009 | DiGirolamo et al. |
| 2009/0124259 A1 | 5/2009 | Attar et al. |
| 2009/0143074 A1 | 6/2009 | Pelletier et al. |
| 2009/0163199 A1 | 6/2009 | Kazmi et al. |
| 2009/0175183 A1 | 7/2009 | Mochizuki et al. |
| 2009/0181710 A1 | 7/2009 | Pani et al. |
| 2009/0207771 A1 | 8/2009 | Lindskog |
| 2009/0239538 A1 | 9/2009 | Motegi et al. |
| 2009/0264164 A1 | 10/2009 | Chun et al. |
| 2009/0318170 A1 | 12/2009 | Lee et al. |
| 2010/0027413 A1 | 2/2010 | Park et al. |
| 2010/0046384 A1 | 2/2010 | Lee et al. |
| 2010/0061285 A1 | 3/2010 | Maeda et al. |
| 2010/0061330 A1 | 3/2010 | Hanov |
| 2010/0067495 A1 | 3/2010 | Lee et al. |
| 2010/0075635 A1 | 3/2010 | Lim et al. |
| 2010/0128669 A1 | 5/2010 | Chun et al. |
| 2010/0165901 A1 | 7/2010 | Kim |
| 2010/0195568 A1 | 8/2010 | Iimori |
| 2010/0227614 A1 | 9/2010 | Chun et al. |
| 2010/0238799 A1 | 9/2010 | Sebire |
| 2010/0238903 A1 | 9/2010 | Kitazoe |
| 2010/0254340 A1 | 10/2010 | Park et al. |
| 2010/0265896 A1 | 10/2010 | Park et al. |
| 2010/0272004 A1 | 10/2010 | Maeda et al. |
| 2010/0309877 A1 | 12/2010 | Damnjanovic et al. |
| 2011/0039536 A1 | 2/2011 | Lee et al. |
| 2011/0090836 A1 | 4/2011 | Mochizuki et al. |
| 2011/0116436 A1 | 5/2011 | Bachu et al. |
| 2011/0207427 A1 | 8/2011 | Kitani et al. |
| 2011/0261743 A1 | 10/2011 | Futaki et al. |
| 2012/0002589 A1 | 1/2012 | Saifullah et al. |

FOREIGN PATENT DOCUMENTS

| | | |
|---|---|---|
| CN | 1731887 A | 2/2006 |
| CN | 1751460 | 3/2006 |
| CN | 1835627 A | 9/2006 |
| EP | 0 889 664 | 1/1999 |
| EP | 1 148 753 | 10/2001 |
| EP | 1 168 877 | 1/2002 |
| EP | 1 209 938 | 5/2002 |
| EP | 1 304 898 | 4/2003 |
| EP | 1 315 356 | 5/2003 |
| EP | 1 318 632 | 6/2003 |
| EP | 1337124 A2 | 8/2003 |
| EP | 1 372 310 | 12/2003 |
| EP | 1 420 551 | 5/2004 |
| EP | 1 501 328 | 1/2005 |
| EP | 1499144 A1 | 1/2005 |
| EP | 1 511 245 | 3/2005 |
| EP | 1 720 373 | 11/2006 |
| EP | 1720322 A1 | 11/2006 |
| EP | 1932380 | 6/2008 |
| EP | 2087653 | 8/2009 |
| JP | 6-006294 | 1/1994 |
| JP | 2002-539686 | 11/2002 |
| JP | 2003-504935 | 2/2003 |
| JP | 2003-087180 | 3/2003 |
| JP | 2003-196775 | 7/2003 |
| JP | 2003-235064 | 8/2003 |
| JP | 2004-134904 A | 4/2004 |
| JP | 2005-39726 A | 2/2005 |
| JP | 2005-057787 | 3/2005 |
| JP | 2005-354488 | 12/2005 |
| JP | 2006-505979 | 2/2006 |
| JP | 2006-067115 | 3/2006 |
| JP | 2006-528456 | 12/2006 |
| JP | 2007-165635 | 6/2007 |
| JP | 2008-535370 | 8/2008 |
| JP | 2008-539678 | 11/2008 |
| JP | 2009-540721 | 11/2009 |
| JP | 2009-542100 | 11/2009 |
| KR | 10-2001-0015234 A | 2/2001 |
| KR | 10-2001-0105240 | 11/2001 |
| KR | 10-2003-0026924 | 4/2003 |
| KR | 1020030093604 A | 12/2003 |
| KR | 10-2004-0039944 | 5/2004 |
| KR | 10-2004-0048675 | 6/2004 |
| KR | 1020040086950 A | 10/2004 |
| KR | 10-2005-0008440 | 1/2005 |
| KR | 10-2005-0027972 | 3/2005 |
| KR | 10-2005-0096763 | 10/2005 |
| KR | 10-2005-0100552 A | 10/2005 |
| KR | 10-2006-0024756 A | 3/2006 |
| RU | 2249917 C2 | 4/2005 |
| WO | 99/04584 | 1/1999 |
| WO | WO 00/74416 | 12/2000 |
| WO | WO 02/39622 | 5/2002 |
| WO | 02091659 A2 | 11/2002 |
| WO | 03/100988 A2 | 12/2003 |
| WO | 2004/017581 A1 | 2/2004 |
| WO | 2004/028050 A1 | 4/2004 |
| WO | WO 2004/043094 | 5/2004 |
| WO | WO 2004/064272 | 7/2004 |
| WO | 2004/091246 A1 | 10/2004 |
| WO | 2004/102833 | 11/2004 |
| WO | WO 2005/048613 | 5/2005 |
| WO | WO2005/067262 | 7/2005 |
| WO | 2005/122616 A1 | 12/2005 |
| WO | WO 2006/000876 A1 | 1/2006 |
| WO | WO 2006/011763 A2 | 2/2006 |
| WO | WO 2006/018670 | 2/2006 |
| WO | WO 2006/049441 A1 | 5/2006 |
| WO | 2006/075820 A1 | 7/2006 |
| WO | WO 2006/104344 | 10/2006 |
| WO | WO 2006/109851 | 10/2006 |
| WO | WO 2006/116620 | 11/2006 |
| WO | WO 2007/025138 | 3/2007 |
| WO | WO 2007/052888 | 5/2007 |
| WO | WO 2007/078155 | 7/2007 |
| WO | WO 2007/078172 | 7/2007 |
| WO | WO 2007/078929 A2 | 7/2007 |
| WO | WO 2007/133034 | 11/2007 |
| WO | 2008/051466 A2 | 5/2008 |
| WO | WO 2008/096984 A1 | 8/2008 |
| WO | WO 2008/111684 A1 | 9/2008 |
| WO | WO 2009/084998 | 7/2009 |

OTHER PUBLICATIONS

Nokia, "Discontinuous reception in CELL__", 3GPP TSG-RAN WG2 Meeting #58, St. Julian's, Malta, Mar. 26-30, 2007, R2-071403.

(56) References Cited

OTHER PUBLICATIONS

Catt, "Non-synchronized access and C-RNTI allocation", 3GPP WSG-RAN WG2, #55, Seoul, Korea, Oct. 9-13, 2006, R2-062933.
Catt, "Non-synchronized access and C-RNTI allocation", 3GPP TSG-RAN WG2 #55, Seoul, Korea, Oct. 9-13, 2006, R2-062933.
Ericsson: "Initial Random Access Procedure for E-UTRAN", 3GPP TSG-RAN WG2 #55, Seoul, Korea, Oct. 9-13, 2006, R2-062853.
Samsung: "LTE Random access procedure", 3GPP TSG RAN #54, Tallinn, Estonia, Aug. 28-Sep. 2, 2006, R2-062258.
Siemens: "Initial Access Procedure", 3GPP TSG-RAN WG2 LTE Adhoc meeting, Cannes, France, Jun. 27-30, 2006, R2-061931.
IPWireless: "Contention Resolution in Non-Synchronous RACH Access", RAN2 #54, Tallinn, Estonia, Aug. 28-Sep. 1, 2006, R2-062269.
R2-061986, "Initial access procedure", LG Electronics, Jun. 27 to 30, 2006.
3rd Generation Partnership Project "Radio Interface Protocol Aspects" 3GPP TR 25.813, May 29, 2006.
Ericsson "DRX and DTX in LTE_Active", R2-060967, Mar. 27, 2006.
NTT DoCoMo, Inc: "E-mail discussion on U-plane ciphering location for LTE", 3GPP TSG RAN WG2 #57bis, St. Julian's, Malta, Mar. 26-30, 2007, R2-071293.
LG Electronics: "U-plane ciphering at MAC / Physical Layer", 3GPP TSG RAN WG2 #57bis, St. Julian's, Malta, Mar. 26-30, 2007, R2-071550.
LG Electronics: "UL Timing Control related to Contention Resolution", 3GPP TSG-RAN WG2 #61bis, Shenzhen, China, Mar. 31-Apr. 4, 2008, R2-081607, XP050139334.
$3^{rd}$ Generation Partnership Project: Evolved Universal Terrestrial Radio Access (E-UTRA) Medium Access Control (MAC) protocol specification (Release 8), Technical Specification Group Radio Access Network, Mar. 1, 2008, XP050377617.
ALCATEL-LUCENT: "Downlink Control Signaling and Multiplexing for VOIP, R1-071721", $3^{rd}$ Generation Partnership Project (3GPP) Technicalspecification Group (TSG) Radio Access Network (RAN); Workinggroup 1 (WG1), No. 48bis, Mar. 26, 2007, pp. 1-4, XP002460800.
Nokia Corporation, Nokia Siemens Networks: "MAC Header Format, R2-073891", #GPP TSG-RAN WG2 meeting 59bis, Oct. 1, 2007, XP002602993.
LG Electronics Inc.: "Support for VOIP Over MAC-hs/ehs", 3GPP Draft; R2-071542 Support for VOIP Over MAC-HS, $3^{rd}$ Generation Partnership Project (3GPP), Mobile Competence Centre; vol. RAN WG2, No. St. Julian; 20070402, Apr. 2, 2007, XP050134474.
Youjun Gao et al: "Research on the access network and MAC technique for beyond 3G systems" IEEE Wireless Communications, IEEE Service Center, Piscataway, NJ, US, vol. 14, No. 2, Apr. 1, 2007, pp. 57-61, XPO11184637 ISSN: 1536-1284.
ASUSTEK: "Granularity Consideration for Variable RLC PDUsizes"; R2-070336, XP050133423, Jan. 12, 2007.
3GPP; "Technical Specification Group Radio Access Network"; Medium Access control (MAC) protocol specification (Release 7); XP050367709, Mar. 1, 2007.
Bosch: "Header Compression Signalling" 3GPP Draft; XP050114120, Nov. 29, 1999.
3GPP; "Packet Data Convergence Protocol (PDCP) Specification (Release 7)", 3GPP TS 25.323, XP050367856, Mar. 1, 2007.
LG Electronics Inc: "PDCP retransmissions" 3GPP Draft; R2-073041 PDCP Retransmissions_V2, Aug. 16, 2007, XP050135778.
LG Electronics Inc: "Contents of PDCP Status Report R2-07xxxx", 3GPP TSG-RAN WG2, 59, Oct. 8, 2007, pp. 1-3, XP002580785.
"PDCP Structure and Traffic Path" 3GPP Draft; R2-073259, Aug. 16, 2007, XP050135985.
NTT DOCOMO et al: "MAC PD U structure for LTE", 3GPP TSG RAN WG2 #56bis, R2-070280, Jan. 2007, XP050133369.
Catt et al: "Enhancement to Buffer Status Reporting", 3GPP TSG-RAN WG2 #57bis, R2-071345, Mar. 2007, XP050134291.
Sammour et al., U.S. Appl. No. 60/863,185.

IP Wireless, "Layer 2 functions for LTE", 3GPP TSG RAN WG2 #48bis, R2-052377, Oct. 2005.
Samsung, "Selective forwarding/retransmission during HO", 3GPP TSG-RAN2 Meeting #56bis, R2-070130, Jan. 2007.
Samsung, "Re-use of PDCP SN at ARQ level ?", 3GPP TSG-RAN2 Meeting #53bis, R2-061829, Jun. 2006.
Nokia, "Requirements for redirection in E-UTRAN", 3GPP TSG-RAN WG2 Meeting #56bis, R2-070107, Jan. 2007.
Panasonic, "MAC PDU format for LTE", 3GPP TSG RAN WG2#56bis, R2-070096, Jan. 2007.
LG Electronics Inc., "Relative Buffer Status Reporting", 3GPP TS-RAN WG2 meeting #46bis, R2-050852, Apr. 2005.
LG Electronics, Multi-level DRX Operation in CELL_PCH, 3GPP TSG-RAN WG2 #58, R2-071930, May 7-11, 2007.
NEC, Fast setup for PS services (Cell PCH & URA PCH), 3GPP TSG-RAN2 Meeting #54, Tdoc R2-062328, Aug. 28, 2006-Sep. 1, 2006.
Ericsson: "MAC header for improved L2 support for high data rates", 3GPP TSG-RAN WG2 #57, St. Louis, Missouri, Feb. 12-16, 2007, R2-070810.
"LTE Handover procedures, text proposal", 3GPP Draft; R2-061338 TP for TR 25813 on LTE Handover-FD, $3^{rd}$ Generation Partnership Project (3GPP), Mobile Competence Centre; 650, Route Des Lucioles; F-06921 Sophia-Antipolis Cedex; France, vol. RAN WG2, No. Shanghai, China; 20060504, May 4, 2006, XP050131278, [retrieved on May 4, 2006] p. 1, lines 7-10, paragraph 2; p. 1, lines 15-16, paragraph 2; p. 1, lines 27-30, paragraph 2; p. 3, lines 6-9.
Samsung: "UL Timing Sync Procedure", Internet Citation, Mar. 27, 2006, XP002434793, Retrieved from the Internet: URL:http://www.3gpp.org/ftp/tsg_ran/WG2_RL2/TSGR2_52/Documents/ [retrieved on May 23, 2007] p. 1, paragraph 1; p. 3, paragraph 2.3; p. 4, lines 5-6, paragraph 3.
R2-063034, "Open issues in random access procedure", Qualcomm Europe, Oct. 9 to 13, 2006 Entirety.
Samsung, Contention resolution in aRACH, 3GPP TSG-RAN WG2#57bis R2-071386, Mar. 30, 2007.
TD Tech, Contention Resolution and Initial Random Access, 3GPP TSG-RAN WG2#57 R2-070910, Feb. 19, 2007.
IPWireless, Initial Access Procedure and C-RNTI Allocation, 3GPP TSG-RAN WG2#56bis R2-070301, Jan. 19, 2007.
Ericsson: "Initial, Random Access and Identity Handling", 3GPP Draft; R2-060592, (3GPP), XP050130549, Feb. 9, 2006.
ZTE: "MAC state transition Document: for Discussion", 3GPP Draft; R2-060064, 3rd Generation Partnership Project (3GPP), vol. RAN WG2, XP050130225, Jan. 5, 2006.
"Summary of email discussion on DRX control", 3GPP Draft; R2-07XXXX DRX Control LTE V6, 3rd Generation Partnership Project (3GPP), XP050602959, Mar. 23, 2007, p. 3.
Nokia; "Active Mode DRX", 3GPP Draft; R2-062752 Active Mode DRX, 3rd Generation Partnership Project (3GPP), vol. RAN WG2, XP050132285, Oct. 5, 2006.
LG Electronics: "Discussion on Message 4 in Random Access", 3GPP TSG-RAN WG2, #57, St. Louis, Missouri, Feb. 15-19, 2007, R2-070519.
LG Electronics: "Discussion on Message 4 in Random Access", 3GPP TSG-RAN WG2, #57bis, St. Julian's Malta, Mar. 26-30, 2007, R2-071456.
LG Electronics: "Discussion on Message 4 in Random Access", 3GPP TSG-RAN WG2, #58, Kobe, Japan, May 7-11, 2007, R2-071923.
"ARQ operation and HARQ", 3GPP TSG-RAN WG2#55; R2-062843, 3rd Generation Partnership Project (3GPP), XP008119562, Oct. 9, 2006, pp. 1-4.
NEC, Fast setup for PS services (Cell PCH & URA PCH), 3GPP TSG-RAN WG2#53 R2-061124, May 12, 2006.
LG Electronics, DRX Scheme, 3GPP TSG-RAN WG2#56 R2-063248, Nov. 10, 2006.
Samsung: "DRX operations for connected mode UEs in LTE", 3GPP DRAF; R2-063120 DRX for Connected UE, 3rd Generation Partnership Project (3GPP), XP050132629, Meeting #56, Nov. 6-10, 2006, Riga, Latvia.

(56) References Cited

OTHER PUBLICATIONS

Ericsson: "Issues on DRX in LTE Active", 3GPP Draft; R2-070797, 3rd Generation Partnership Project (3GPP), XP050133822, Feb. 12-16, 2007, St. Louis, Missouri.

Ericsson: "Enhanced Paging Procedure", 3GPP Draft; R2-070586, 3rd Generation Partnership Project (3GPP), XP050133637, Feb. 12-16, 2007, St. Louis, Missouri.

Nokia : "RACH reporting", 3GPP Draft; 24A000008, 3rd Generation Partnership Project (3GPP), XP050141261, Nov. 13, 2000, Sophia Antipolis, France.

Nokia et al: "UL reporting rate for DL quality measurements in CELL_FACH", 3GPP Draft; R2-071404, vol. RAN WG2, XP050134343, Mar. 26-30, 2007, St. Julian's, Malta.

Nokia: "Active Mode DRX", 3GPP TSG-RAN WG2 Meeting #55, Seoul, Korea, Oct. 9-11, 2006, R2-062752.

NTT DoCoMo, Inc.: "Views on DRX/DTX control in LTE", 3GPP TSG RAN WG2 #56, Riga, Lativa, Nov. 6-10, 2006, R2-063397.

Email Rapporteur (Nokia): "DRX in E-UTRAN", 3GPP TSG-RAN WG2 Meeting #57, St. Louis, Missouri, Feb. 12-16, 2007, R2-070463.

\* cited by examiner

METHOD OF TRANSMITTING DATA IN A WIRELESS COMMUNICATION SYSTEM

This application is a continuation of, and claims priority to, U.S. application Ser. No. 12/451,219, filed Oct. 30, 2009, which is a national stage entry of International Application No. PCT/KR2008/002484, filed May 1, 2008, and claims priority to Korean Patent Application No. 10-2008-0040614, filed Apr. 30, 2008 in the Republic of Korea, U.S. Provisional Application No. 60/915,917, filed May 3, 2007, and U.S. Provisional Application No. 60/915,666, filed May 2, 2007, the entire contents of each above-identified applications is hereby incorporated by reference for all purposes as if fully presented herein.

TECHNICAL FIELD

The present invention relates to a wireless communication system, and more particularly, to a method of configuring a data block in a wireless communication system.

BACKGROUND ART

FIG. 1 is a diagram illustrating a network structure of an E-UMTS (Evolved-Universal Mobile Telecommunications System). An E-UMTS is a system evolving from the conventional WCDMA (wideband code division multiple access) UMTS and its basic standardization is currently handled by the 3GPP ($3^{rd}$ Generation Partnership Project). The E-UMTS can also be called an LTE (Long Term Evolution) system.

Referring to FIG. 1, an E-UTRAN (UMTS terrestrial radio access network) includes base stations (hereinafter, referred to as 'eNode B' or 'eNB'), wherein the respective eNBs are connected with each other through X2 interface. Also, each of eNBs is connected with a user equipment (UE) through a radio interface and connected with an EPC (Evolved Packet Core) through S1 interface. The EPC includes MME/SAE gateway (Mobility Management Entity/System Architecture Evolution gateway).

Layers of a radio interface protocol between a UE and a network can be classified into a first layer L1, a second layer L2 and a third layer L3 based on three lower layers of OSI (open system interconnection) standard model widely known in communication systems. A physical layer belonging to the first layer L1 provides an information transfer service using a physical channel. A radio resource control (hereinafter, abbreviated as 'RRC') layer located at the third layer plays a role in controlling radio resources between the UE and the network. For this, the RRC layer enables RRC messages to be exchanged between the UE and the network. The RRC layer may distributively be located at network nodes including Node B, an AG and the like, or may independently be located at either the Node B or the AG FIG. 2 is a schematic view illustrating an E-UTRAN (UMTS terrestrial radio access network). In FIG. 2, a hatching part represents functional entities of a user plane and a non-hatching part represents functional entities of a control plane.

FIG. 3A and FIG. 3B illustrate a structure of a radio interface protocol between the user equipment (UE) and the E-UTRAN, in which FIG. 3A is a schematic view of a control plane protocol and FIG. 3B is a schematic view of a user plane protocol. Referring to FIG. 3A and FIG. 3B, a radio interface protocol horizontally includes a physical layer, a data link layer, and a network layer and vertically includes a user plane for data information transfer and a control plane for signaling transfer. The protocol layers in FIG. 3A and FIG. 3B can be classified into L1 (first layer), L2 (second layer), and L3 (third layer) based on three lower layers of the open system interconnection (OSI) standard model widely known in the communications systems.

The physical layer as the first layer provides information transfer service to an upper layer using physical channels. The physical layer is connected to a medium access control (hereinafter, abbreviated as 'MAC') layer above the physical layer via a transport channel. Data are transferred between the medium access control layer and the physical layer via the transport channel. Moreover, data are transferred between different physical layers, and more particularly, between one physical layer of a transmitting side and the other physical layer of a receiving side via the physical channel. The physical channel of the E-UMTS is modulated according to an orthogonal frequency division multiplexing (OFDM) scheme, and time and frequency are used as radio resources.

The medium access control (hereinafter, abbreviated as 'MAC') layer of the second layer provides a service to a radio link control (hereinafter, abbreviated as 'RLC') layer above the MAC layer via a logical channel. The RLC layer of the second layer supports reliable data transfer. In order to effectively transmit IP packets (e.g., IPv4 or IPv6) within a radio-communication period having a relatively narrow bandwidth, a PDCP layer of the second layer (L2) performs header compression to reduce unnecessary control information.

A radio resource control (hereinafter, abbreviated as 'RRC') layer located on a lowest part of the third layer is defined in the control plane only and is associated with configuration, reconfiguration and release of radio bearers (hereinafter, abbreviated as 'RBs') to be in charge of controlling the logical, transport and physical channels. In this case, the RB means a service provided by the second layer for the data transfer between the UE and the UTRAN.

Hereinafter, the PDCP layer included in the second layer will be described.

The PDCP layer is connected with its upper layer, i.e., RRC layer or a user application layer, and is connected with its lower layer, i.e., RLC layer. Main functions carried out by the PDCP layer include a header compression function and a security function. The header compression function is used to enhance use efficiency of radio resources, and is advantageous in that the quantity of information to be transmitted from a radio terminal is decreased using common features of packets transmitted through a single Internet packet stream. Examples of the security function include ciphering and integrity check, and the security function is used to prevent data manipulation or monitoring by the third party from occurring.

Of a header compression scheme used in the PDCP layer, a robust header compression (ROHC) scheme is used to reduce header information of RTP (Real-time Transport Protocol)/UDP (User Datagram Protocol)/IP (Internet Protocol) packets. In addition to the ROCH scheme, another example of the header compression scheme includes RFC2507.

The ROHC scheme is based on the fact that field values of packet headers in continuous packets belonging to one packet stream are almost constant. Accordingly, the ROHC scheme transmits a variable field not all the fields included in the packet headers. For reference, the entire header size of RTP/UDP/IP packets which are not compressed is 40 octet in case of IPv4 (IP version 4) and 60 octet in case of IPv6 (IP version 6) while size of a pure data part called payload is generally 15-20 octet. Accordingly, it is noted that transmission efficiency is very low as control information has a structure greater than that of user data to be actually transmitted. In this respect, if the header compression scheme is used, the quantity of control information can be reduced remarkably. For example, size of the header reduced by the ROHC scheme is only 1 octet to 3 octets.

The ROHC scheme is divided into a uni-directional mode (hereinafter, abbreviated as 'U-mode'), a bi-directional optimistic mode (hereinafter, abbreviated as 'O-mode') and a bi-directional reliable mode (hereinafter, abbreviated as 'R-mode'). In case of the U-mode, the transmitting side performs uni-directional communication to the receiving side. In case of the O-mode or R-mode, the transmitting side performs bi-directional communication to transmit real-time packets and the receiving side transmits transmission status information to the transmitting side. Therefore, according to the ROHC scheme of the O-mode and the R-mode, the transmitting side transmits header compressed packets of data and controls transmission of real-time traffic packets in response to ROHC status information (ACK or NACK) received from the receiving side. A use purpose of the ROHC status information transferred from the receiving side to the transmitting side may depend on the mode. The ROHC scheme of the O-mode increases compression efficiency by mainly transmitting NACK related information, and the ROHC scheme of the R-mode supports robuster header compression scheme by using strict logic based on the ROHC status information. The ROHC status information can be called feedback information in a header compression procedure. In addition to the ROHC scheme, feedback information is also used in another header compression scheme.

Among the modes of the ROCH scheme, the U-mode will be described in detail. A compressor has three statuses, i.e., an entire context forming status, a dynamic context forming status, and an entire context perfect status. A type of a compression header packet is varied depending on each status, and its operation method is also varied depending on each status. First of all, a structure of a context will be described. The structure of a context includes a static context and a dynamic context.

FIG. 4 illustrates a status of an ROHC U-mode compressor according to the related art and its shift procedure. Referring to FIG. 4, the entire context forming status means that the entire context has not been formed at all, or the entire context should be reconstructed due to its damage. The dynamic context forming status means that a dynamic context part of the entire context should be reconstructed due to its damage. The entire context perfect status means that the entire context is in a perfect status without damage. Each status is shifted to another status per period. At this time, the respective periods are different from one another. For example, a shift period from the entire context perfect status to the dynamic context forming status is much greater than that from the entire context perfect status to the entire context forming status.

DISCLOSURE OF THE INVENTION

A data block generated in the aforementioned PDCP layer according to the related art can be divided into various types depending on whether data included in the data block are transferred from an upper layer or generated directly in the PDCP layer. Also, the data block generated in the PDCP layer can be divided into various types depending on whether data transferred from an upper layer are user data or control data. Meanwhile, since whether to apply a header compression function, whether to apply a ciphering and/or integrity check function, and so on are determined depending on a type of each data block generated in the PDCP layer, a method of processing data efficiently by dividing each data block depending on its type is required.

Accordingly, an object of the present invention is to provide a method of processing data efficiently in a wireless communication system, which substantially obviates one or more problems due to limitations and disadvantages of the related art.

To achieve these objects and other advantages and in accordance with the purpose of the invention, as embodied and broadly described herein, a method of generating a data block to be transmitted to a receiving side at a protocol layer performing a header compression function in a wireless communication system comprises generating at least one of a control packet including control information and a compressed packet generated by header compression for an upper layer data block, and generating, in case that the control packet is generated, a first lower layer data block which includes type indication information and the control packet, the type indication information indicating a type of control information included in the generated control packet In another aspect of the present invention, a method of generating a data block to be transmitted from a transmitting side to a receiving side in a wireless communication system comprises generating a control packet at a protocol entity which carries out header compression for an upper layer data block, the control information being associated with a data block received from the receiving side, and generating a first data block which includes a header and the control packet, the header including a type field indicating a type of the control information included in the generated control packet.

BRIEF DESCRIPTION OF THE DRAWINGS

FIG. 3A and FIG. 3B illustrate a structure of a radio interface protocol between a user equipment (UE) and E-UTRAN, in which FIG. 3A is a schematic view of a control plane protocol and FIG. 3B is a schematic view of a user plane protocol;

BEST MODE FOR CARRYING OUT THE INVENTION

Hereinafter, structures, operations, and other features of the present invention will be understood readily by the preferred embodiments of the present invention, examples of which are illustrated in the accompanying drawings.

Figure 1:
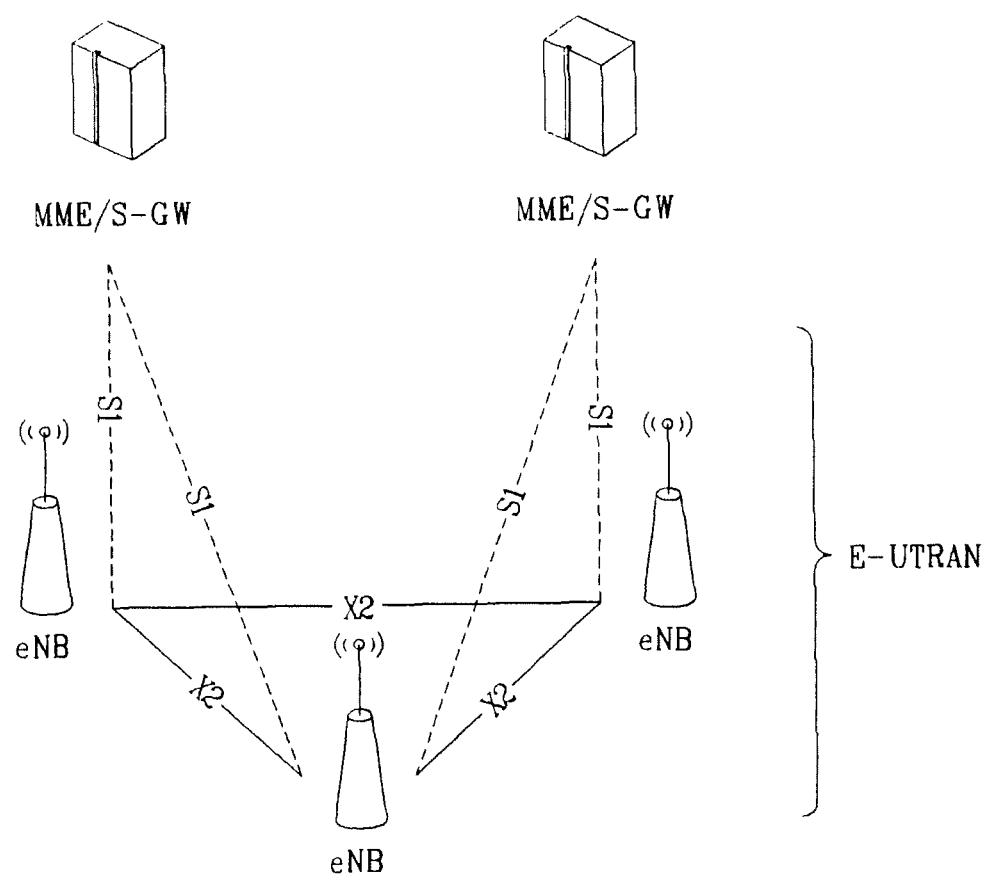
FIG. 1 illustrates a network structure of an E-UMTS (Evolved-Universal Mobile Telecommunications System)
Figure 2:
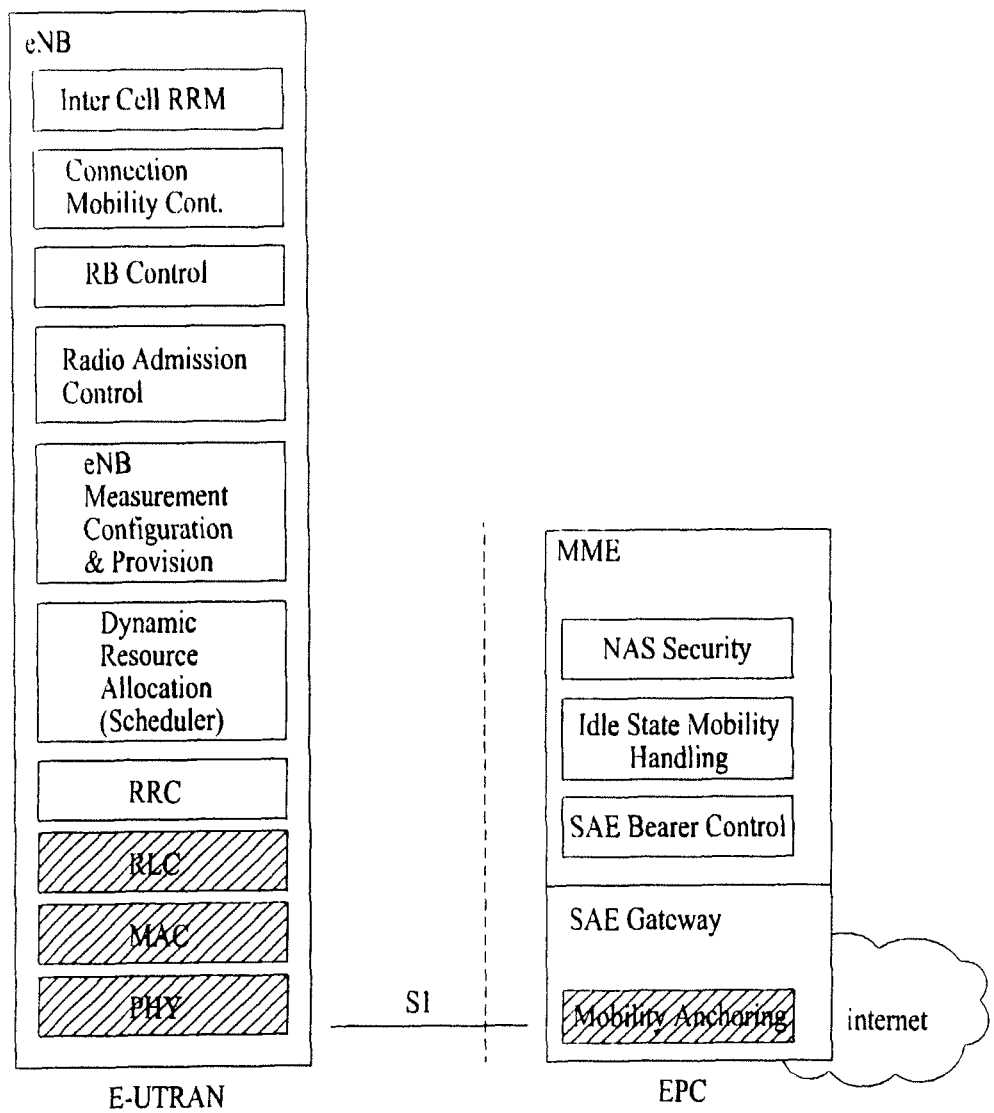
FIG. 2 is a schematic view illustrating an E-UTRAN (UMTS terrestrial radio access network)
Figure 3A:
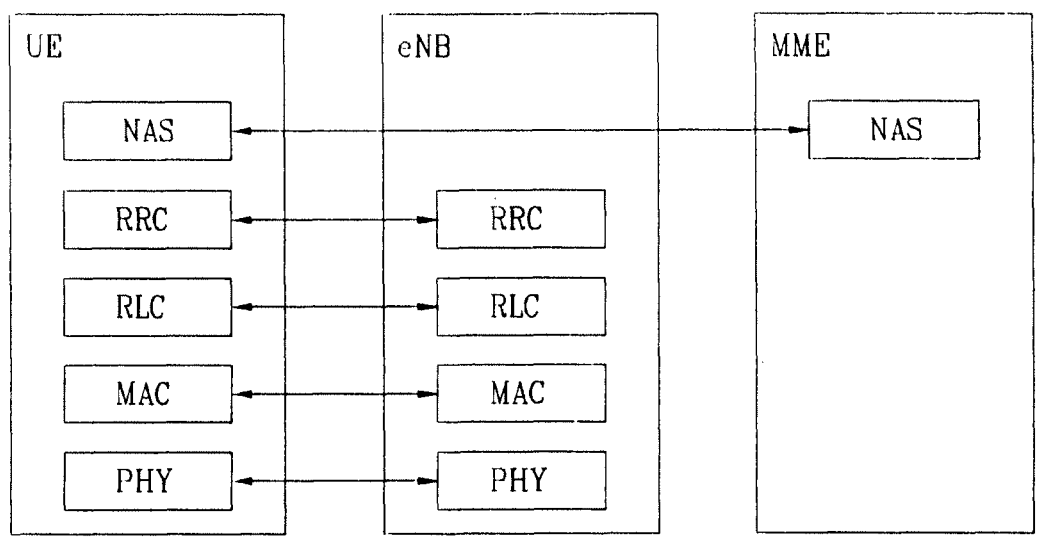
Figure 3B:
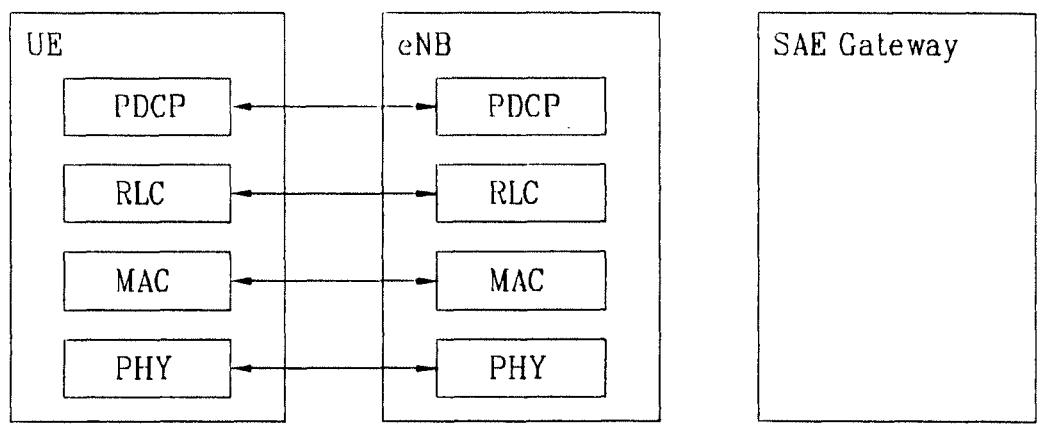
Figure 4:
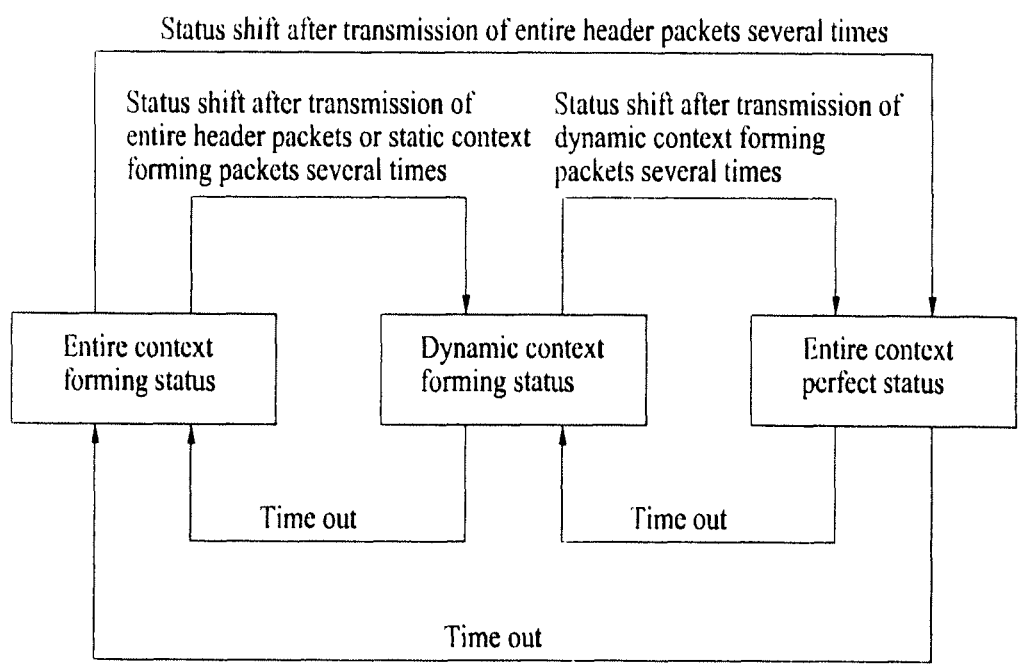
FIG. 4 illustrates a status of an ROHC U-mode compressor according to the related art and its shift procedure.
Figure 5:
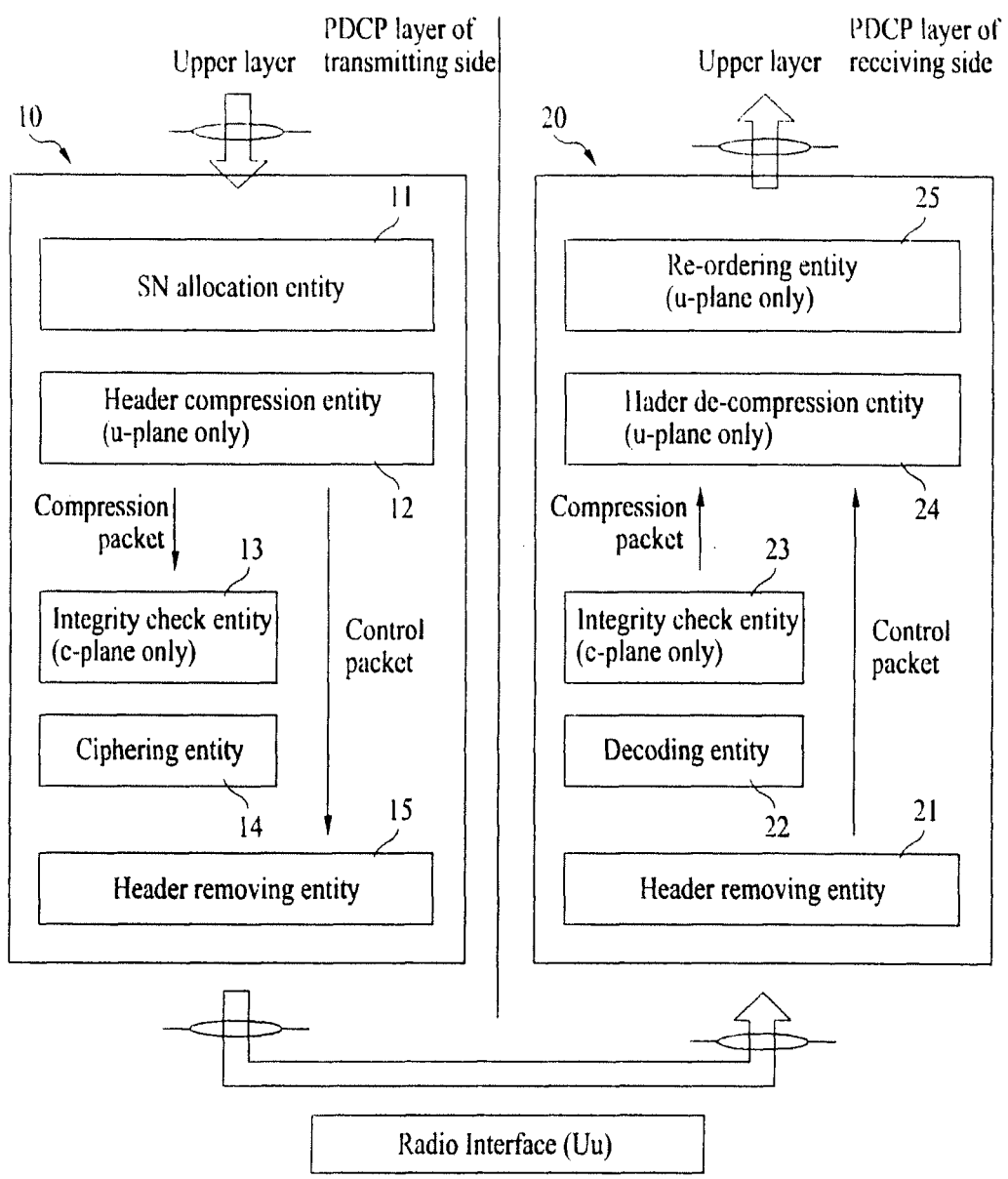
FIG. 5 illustrates functional entities included in PDCP layers of a transmitting side and a receiving side of E-UMTS.

FIG. 5 is a diagram illustrating functional entities included in PDCP layers of a transmitting side and a receiving side of E-UMTS. Although one entity corresponding to each function performed by the PDCP layers is illustrated in FIG. 5, two or more entities may be combined to constitute one entity.

Referring to FIG. 5, the PDCP layer of the transmitting side receives upper layer data, i.e., PDCP SDU (Service Data Unit) from an upper layer such as an RRC layer or an application layer. The upper layer data transferred from the RRC layer is signaling information of a control plane for carrying out a function of the RRC layer, and the upper layer data transferred from the application layer is data of a user plane.

A sequence number (SN) allocation entity 11 allocates a sequence number (SN) to the PDCP SDU transferred from the upper layer. A header compression entity 12 carries out a header compression function for the data of the user plane, i.e., the PDCP SDU, which are transferred from the upper layer. As described above, the header compression entity 12 can use an ROHC scheme as a compression scheme, and configures a header which includes a part not the entire of fields included in a header of a packet based on the fact that values included in corresponding fields of headers of continuous packets belonging to one packet stream are almost constant. However, the header compression entity 12 does not carry out header compression for all PDCP SDUs, and periodically transmits a full header to the receiving side, wherein the full header is not compressed. The receiving side reconstructs compressed headers based on the received full header. The header compression function is not applied to the upper layer data transferred from the RRC layer.

Meanwhile, the header compression entity 12 generates a control packet which has no relation with the PDCP SDU transferred from the upper layer, i.e., which does not include upper layer data. The control packet is related to carrying out the function of the PDCP layer, and includes control information generated by the header compression entity. An example of the control information includes feedback information or status information for at least one PDCP PDU received from the receiving side. The feedback information includes information associated with header compression of a PDCP PDU received from the receiving side. The status information can include information as to whether the PDCP PDU received from the receiving side has been successfully received or whether retransmission is required. The control information can include other control information in addition to the feedback information or the status information.

Figure 6:
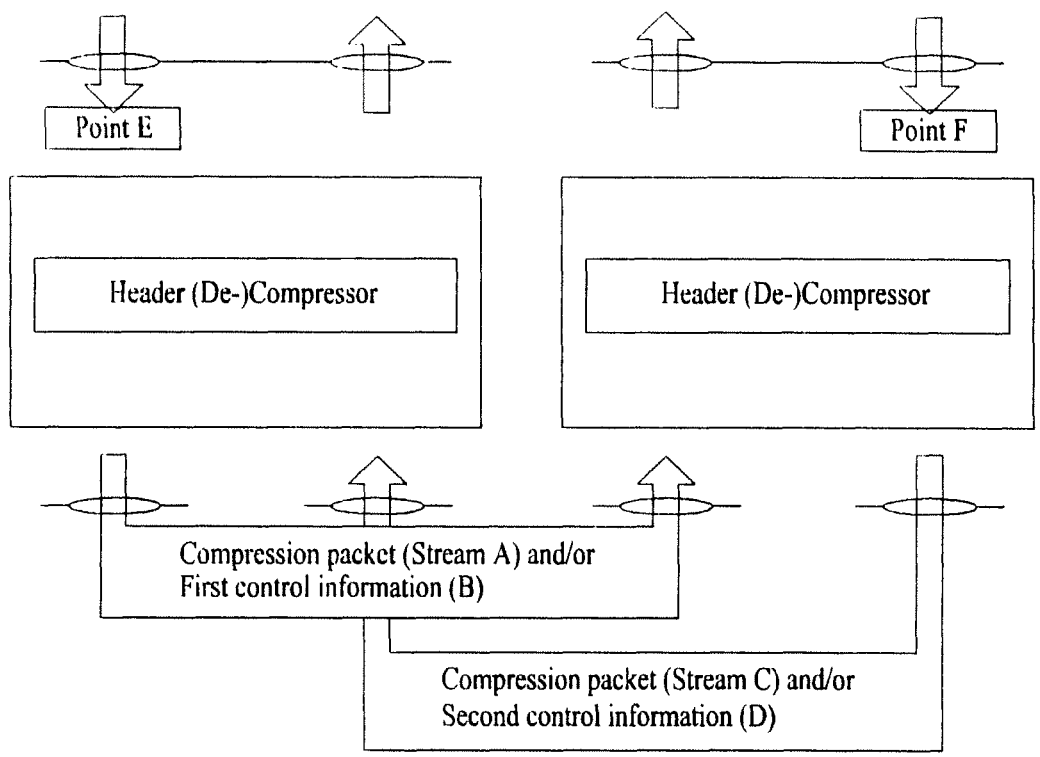
FIG. 6 illustrates a procedure of transferring control information generated in a header compression entity of FIG. 5 to a receiving side.

FIG. 6 is a diagram illustrating a procedure of transferring control information generated in the header compression entity 12 to the receiving side.

Referring to FIG. 6, first control information B is transmitted from the left to the right, and means response information of compressed packet streams, i.e., 'Stream C,' which are transmitted from the right to the left, such as feedback information or status information. Second control information D is transmitted from the right to the left, and means response information of compressed packet streams, i.e., 'Stream A,' which are transmitted from the left to the right. In other words, although 'Stream A' is a stream of packets of PDCP SDUs which are transferred through 'Point E' and then compressed, the first control information B transferred in the same direction has no relation with the PDCP SDUs transferred through 'Point E' and is related with a stream of packets transferred to the PDCP layer through 'Point F' and connected to 'Stream C.' In other words, the first control information and the second control information are related with management of context information. Accordingly, the control information is information generated regardless of PDCP SDUs transferred from the upper layer in view of the PDCP layer of the transmitting side. In this case, a sequence number is not allocated by the SN allocation entity 11.

Referring to FIG. 5 again, an integrity check entity 13 carries out integrity protection for the PDCP SDUs, which include control plane data, i.e., the PDCP SDUs transferred from the RRC layer. The integrity check can be carried out in such a manner that a field called MAC-I (Message Authentication Code for Integrity Protection) is affixed to a PDCP PDU to be transmitted.

A ciphering entity 14 performs ciphering on a compressed packet and an RRC message, wherein the compressed packet has undergone header compression by the header compression entity 12 and the RRC message has undergone integrity protection by the integrity check entity 13. Data (PLAINTEXT BLOCK) is ciphered through bit operation between ciphering parameters and MASK generated by a specific ciphering algorithm to form CIPHERTEXT BLOCK. The CIPHERTEXT BLOCK is transmitted to the receiving side through a radio interface, and the receiving side which has received the CIPHERTEXT BLOCK generates the same MASK through the ciphering algorithm used at the transmitting side to recover the original PLAINTEXT BLOCK. In addition to f8 algorithm used in 3GPP, various algorithms according to the related art can be used as the ciphering algorithm. The ciphering parameters mean CK, COUNT-C, BEARER, DIRECTION, LENGTH, etc, wherein COUNT-C is related with the sequence number of the PDCP SDU where ciphering is carried out, and is varied depending on time. In FIG. 5, a control packet to which the sequence number is not allocated are not ciphered.

A header addition entity 15 generates PDCP PDU by adding a PDCP header to the data block transferred from the header compression entity 12 or the ciphering entity 14. The PDCP PDU can be divided into three types. The first type is a PDCP PDU which includes upper layer data of the control plane, wherein the upper layer data is transferred from the RRC layer. The second type is a PDCP PDU which includes upper layer data of the user plane, wherein the upper layer data is transferred from the application layer which is the upper layer. The third type is a PDCP PDU which includes a control packet generated by the header compression entity 12. A PDCP PDU corresponding to each type includes a different header each other in accordance with the embodiment of the present invention. As illustrated in FIG. 5, since ciphering is carried out by the ciphering entity 14 before header addition, ciphering is not carried out for the header of the PDCP PDU regardless of the type of PDCP PDU.

Figure 7:
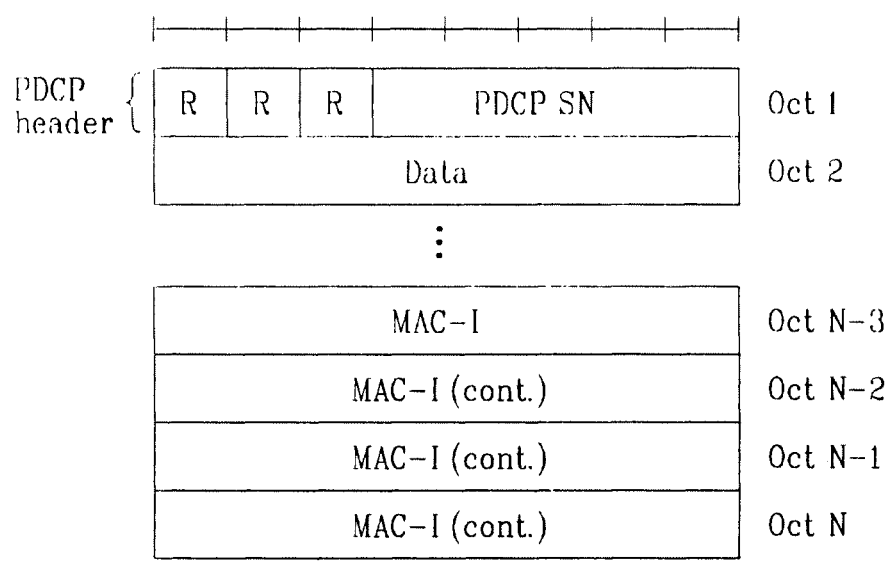
FIG. 7 illustrates an example of a data format of PDCP PDU which includes upper layer data of a control plane.

FIG. 7 is a diagram illustrating an example of a data format of the PDCP PDU which includes the upper layer data of the control plane. As described above, after the sequence number is allocated by the SN allocation entity 11 of FIG. 5 to the upper layer data of the control plane, i.e., the control information transferred from the RRC layer, integrity check is carried out for the control information by the integrity check entity 13. Accordingly, the header of the PDCP PDU illustrated in FIG. 7 includes a PDCP SN field which includes a sequence number. An 'R' field means a reserved bit. A MAC-I field includes a message authentication code added for integrity protection by the integrity check entity 13.

Figure 8:
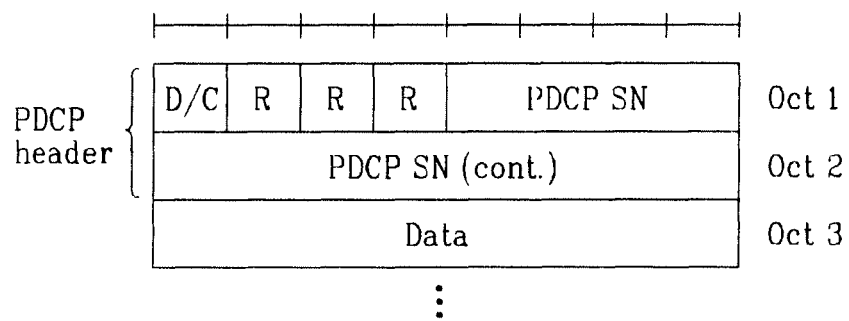
FIG. 8 illustrates an example of a data format of PDCP PDU which includes upper layer data of a user plane.

FIG. 8 is a diagram illustrating an example of a data format of the PDCP PDU which includes the upper layer data of the user plane. The header of the PDCP PDU illustrated in FIG. 8 includes a D/C field and a PDCP SN field. The D/C field includes information indicating whether a corresponding PDCP PDU includes user data or control information. In FIG. 8, the D/C field includes an indicator which indicates that a corresponding PDCP PDU includes user data.

Figure 9A:
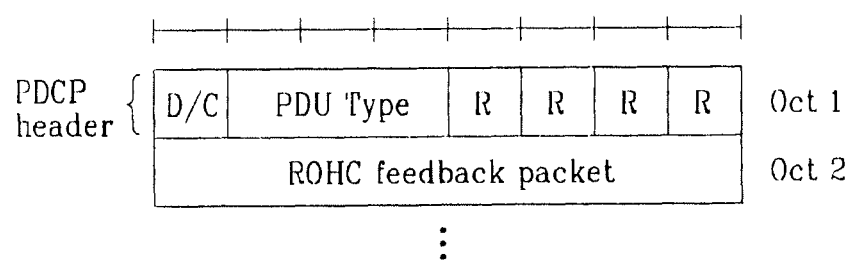
FIG. 9A and FIG. 9B illustrate examples of data formats of PDCP PDUs which include control information generated in a PDCP layer not an upper layer.
Figure 9B:
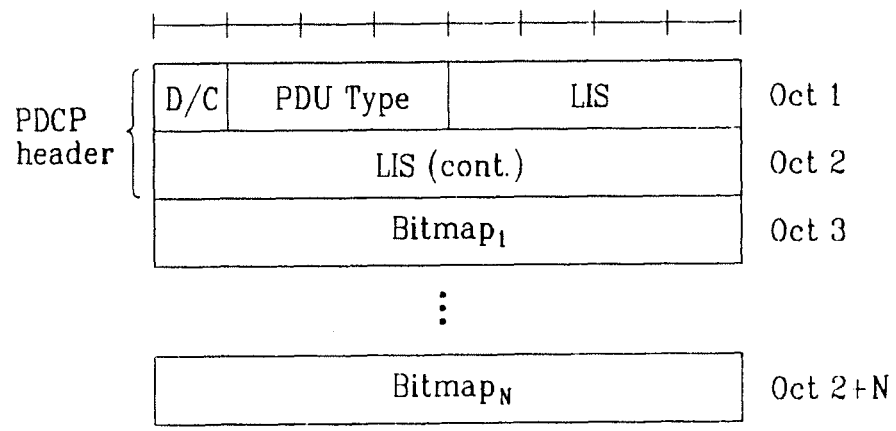

FIG. 9A and FIG. 9B are diagrams illustrating examples of data formats of PDCP PDUs which include control information generated in the PDCP layer not an upper layer, wherein the PDCP PDUs include different types of control information. The PDCP PDUs illustrated in FIG. 9A and FIG. 9B include a D/C field and a PDU type field in common. The D/C field includes an indicator which indicates that a corresponding PDCP PDU includes control information. The PDU type field includes information indicating a type of control information included in the corresponding PDCP PDU. Since FIG. 9A and FIG. 9B include different types of control information, the respective PDU Type fields include different types of information. Accordingly, the receiving side can identify what type of control information is included in the corresponding PDCP PDU, by using the information included in the PDU Type field.

The control information included in the PDCP PDU of FIG. 9A includes an interspersed ROHC feedback packet. The interspersed ROHC feedback packet is generated by the header compression entity 12 of FIG. 5, have no relation with the PDCP SDU transferred from the upper layer, and include feedback information of the PDCP PDU transmitted from the receiving side. The information included in the PDCP PDU of FIG. 9B is status report information, and includes information indicating whether a plurality of PDCP PDUs transmitted from the receiving side have been successfully received. For example, the status report information can include information as to whether the plurality of PDCP PDUs transmitted from the receiving side have been successfully received, in a bit map type. In addition to the control information included in the PDCP PDUs illustrated in FIG. 9A and FIG. 9B, if there exists another type of control information generated in the PDCP PDU layer, PDCP PDU which includes such another type of control information can be configured. The PDU Type field included in the header of the corresponding PDCP PDU includes information different from the PDU Type field included in the PDCP PDUs of FIG. 9A and FIG. 9B, so that the PDU Type fields can be identified from each other. An example of another type of control information generated in the PDCP layer includes status report information for reporting reception acknowledgement information of PDCP SDUs after carrying out handover.

Referring to FIG. 5 again, a procedure in the PDCP layer of the receiving side for receiving a PDCP PDU from the transmitting side, carrying out data processing for the received PDCP PDU in accordance with the PDCP protocol, and transferring the data-processed PDCP PDU to the upper layer is carried out in an inverse order of the procedure in the PDCP layer of the transmitting side. At this time, the PDCP layer of the receiving side identifies a type of the PDCP PDU or a type of control information included in the PDCP PDU with reference to information included in the header of the received PDCP PDU, i.e., D/C field, PDU Type field, PDCP SN field, etc., and is operated in accordance with the identified result.

In FIG. 5, a header removing entity 21 removes the header from the received PDCP PDU. A decoding entity 22 carries out decoding for the PDCP PDU from which the header has been removed. If the decoded PDCP PDU includes data of the control plane, an integrity check entity 23 carries out integrity check for the decoded PDCP PDU. If the decoded PDCP PDU includes data of the user plane, a header de-compression entity 24 carries out header de-compression for the decoded PDCP PDU. A re-ordering entity 25 carries out a re-ordering procedure of the PDCP SDUs generated as above and then transfers the PDCP SDUs to the upper layer. If the PDCP PDU received from the transmitting side is identical with the PDCP PDU illustrated in FIG. 9A or FIG. 9B, the PDCP PDU of which the header has been removed by the header removing entity 21 is transferred to the header de-compression entity 24 without integrity check or header de-compression.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method of transmitting and receiving data in the wireless communication system according to the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be applied to a wireless communication system such as a mobile communication system and a wireless Internet system.

What is claimed is:

1. A transmitting apparatus for generating a data block to be transmitted to a receiving apparatus in a wireless communication system, the transmitting apparatus comprising:
a processor configured to generate a first lower layer data block which includes a data packet received from an upper layer and generate a second lower layer data block which includes a control packet,
wherein each of the first lower layer data block and the second lower layer data block includes an indicator indicating whether the corresponding lower layer data block includes the data packet or the control packet, wherein the second lower layer data block further includes type indication information indicating whether the control packet includes header compression feedback information, wherein the processor is configured to add the indicator to the data packet to generate the first lower layer data block, and the processor is configured to add the indicator and the type indication information to the control packet to generate the second lower layer data block, and wherein the processor is configured to generate the first lower layer data block to include a sequence number and generate the second lower layer data block not to include a sequence number.

2. The transmitting apparatus of claim 1, wherein the indicator is included in a header of the first lower layer data block, and the type indication information and the indicator are included in a header of the second lower layer data block.

3. The transmitting apparatus of claim 1, wherein the type indication information indicates whether the control packet includes status information for at least one data block received from the receiving apparatus.

4. The transmitting apparatus of claim 1, wherein the header compression feedback information is associated with header compression of a data block received from the receiving apparatus.

5. The transmitting apparatus of claim 1, wherein the processor is configured to include a header compression entity configured to perform a header compression function, wherein the header compression entity is configured to generate at least one of the control packet and the data packet.

6. The transmitting apparatus of claim 1, wherein the processor is configured to further include a ciphering entity configured to cipher the data packet.

7. The transmitting apparatus of claim 1, wherein the processor is configured to further include a header addition entity configured to add the indicator to the data packet or add the indicator and the type indication information to the control packet.

8. The transmitting apparatus of claim 1, further comprising:
a transmitter configured to transmit the first lower layer data block and the second lower layer data block to the receiving apparatus.

9. A receiving apparatus for receiving a data block transmitted by a transmitting apparatus in a wireless communication system, the receiving apparatus comprising:
a processor configured to determine, based on an indicator included in the data block, whether the data block includes a data packet of an upper layer of the transmitting apparatus or a control packet; and if the indicator indicates that the data block includes the control packet, configured to determine, based on type indication information included in the data block, whether the control packet includes header compression feedback information, wherein:
if the data block includes the data packet, the processor is configured to remove a sequence number from the data block and transfer the data packet to an upper layer of the receiving apparatus, and
wherein the data block does not include a sequence number if the data block includes the control packet.

10. The receiving apparatus of claim 9, wherein if the data block includes the data packet, the data block does not include the type indication information.

11. The receiving apparatus of claim 10, wherein the indicator and the type indication are included in a header of the data block.

12. The receiving apparatus of claim 11, wherein the processor is configured to remove the header from the data block.

13. The receiving apparatus of claim 12, wherein the processor is configured to include a header removing entity configured to remove the header from the data block.

14. The receiving apparatus of claim 9, wherein the processor is configured to further determine, based on the type indication information, whether the control packet includes status information for at least one data block received at the transmitting apparatus from the receiving apparatus.

15. The receiving apparatus of claim 9, wherein the header compression feedback information is associated with header compression of a data block transmitted from the receiving apparatus to the transmitting apparatus.

16. The receiving apparatus of claim 9, wherein the processor is configured to further include a header de-compression entity configured to perform a header de-compression on the data packet.

17. The receiving apparatus of claim 9, further comprising:
a receiver configured to receive the first lower layer data block and the second lower layer data block from the transmitting apparatus.

* * * * *